United States Patent [19]

Greenaway et al.

[11] 4,376,887
[45] Mar. 15, 1983

[54] DEVICE FOR THE THERMAL ERASURE OF MECHANICALLY READABLE OPTICAL MARKINGS

[75] Inventors: David L. Greenaway, Oberwil; Joseph A. Clarinval, Rotkreuz; Alex Nyfeler, Baar, all of Switzerland

[73] Assignee: LGZ Landis & Gyr Zug AG, Zug, Switzerland

[21] Appl. No.: 207,969

[22] PCT Filed: Oct. 29, 1979

[86] PCT No.: PCT/CH79/00140
§ 371 Date: Sep. 22, 1980
§ 102(e) Date: Sep. 22, 1980

[87] PCT Pub. No.: WO80/01616
PCT Pub. Date: Aug. 7, 1980

[30] Foreign Application Priority Data
Feb. 1, 1979 [CH] Switzerland ............... 977/79

[51] Int. Cl.³ ................... G06K 19/06; G06K 7/10
[52] U.S. Cl. ........................... 235/487; 235/457; 235/419; 235/454
[58] Field of Search .......... 235/419, 457, 487, 454; 365/1.26

[56] References Cited
U.S. PATENT DOCUMENTS
4,143,810 3/1979 Greenaway .................. 235/487

Primary Examiner—Harold I. Pitts
Attorney, Agent, or Firm—Ernest F. Marmorek

[57] ABSTRACT

An apparatus adapted for thermally erasing or changing machine readable optical markings previously entered on a carrier of thermoplastic material which has two major sides, and wherein the optical markings cause a predetermined modification of any light rays impinging on the optical markings by either diffraction or refraction, include a erasing device adapted to be located on one major side of the carrier, for erasing or changing the markings, a reading device, operative during operation of the erasure device, and including at least two light sensors adapted to be located on the other major side of the carrier, so as to check the erasure or change of the markings effected by the erasing device. The light sensors provide output signals of respective opposite polarities following erasure or change of any one of the markings. A moving device generates a relative movement between the carrier and the erasing and reading devices, respectively, and a comparator is postcoupled to the light sensors, and includes a detector for indicating whether the output of the comparator exceeds or is below respective predetermined limits. A control device controls the operation of the erasing device of the moving device and is arranged to inhibit the operation of the erasure device when the output of the comparator exceeds or falls below the limits, respectively, so that the limits establish a uniform criterion for effecting erasure of the markings.

11 Claims, 8 Drawings

DEVICE FOR THE THERMAL ERASURE OF MECHANICALLY READABLE OPTICAL MARKINGS

BACKGROUND OF THE INVENTION

A device is known from the Swiss patent (CH-PS 574 144), in which a card-like or tape-like payment-means contains a multitude of units of values in form of mechanically readable optical markings which, to give an example, can be holograms or diffraction screens. For cashless payments for goods or services rendered, the payment-means are devaluated step-by-step in accordance with the amount to be paid, namely in that the markings are thermically erased by means of a transparent heating element. A reading-light-beam is directed through the transparent heating element to a marking, the marking is then checked by means of light sensing elements for genuineness, is then erased and by means of signals obtained from the light sensing elements, a check is performed whether the marking has been actually erased.

Furthermore, a method for the production of a document is known from Swiss patent CH-PS 594 935, in the case of which a multitude of optical markings, which for example can be holograms or diffraction screens, are recorded on a carrier and in which, for the purpose of writing in a code, selected markings are then subsequently erased. The erasing of the markings takes place by means of heating elements, which consist of a resistance layer which, in turn, has been applied onto a substrate.

Hannan, U.S. Pat. No. 4,108,367, although having some similarities with the present invention, does not attain the objects of the present invention. Both the light source and the light sensors postcoupled to the comparator are disposed on one side of the carrier. The output signals of the light sensors do not have respective opposite polarities when a marking is erased, nor is the reading means operable during the erasure process, as the light rays are interrupted by the erasing head. The duration of the erasure process is determined by the delay of the erasure means in starting and terminating erasures, and is independent of the fact whether or not an adequate erasure has been obtained.

The German laid open patent specification DE 26 59 639 teaches reading means and an erasure head disposed on the same side of a document, and therefore teaches away from the present invention.

Schaffer, U.S. Pat. No. 2,975,282 teaches how to copy information from a credit card by means of a lamp onto one side of a sales ticket, and is not relevant to the present invention.

Hickey et al, U.S. Pat. No. 3,921,969 is not relevant other than documenting the fact that a moving or transportation device for documents is known.

It should be added that British Pat. No. 1 502 460 is equivalent to Swiss Pat. No. 574,144, and that U.S. Pat. No. 4,143,810 is equivalent to Swiss Pat. No. 594,935.

OBJECT OF THE INVENTION

The invention recited in claim 1 has as its objective of improving the quality of the erasing process by simple measures and to assure that, for the purpose of attaining a rapid action and/or an optimum use of the energy available for the erasing process, the marking is sufficiently erased, but not to an unnecessarily high degree.

BRIEF DESCRIPTION OF THE DRAWINGS

In the following, a few exemplified embodiments will be explained in more detail with reference to the drawings.

DESCRIPTION OF THE PREFERRED EMBODIMENT

Figure 1:
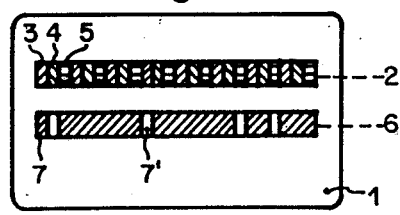
FIG. 1 shows a card-like carrier.

In FIG. 1, 1 denotes a card-like carrier made of thermo-plastic material, which carrier can be an identification card, an admission card, a credit card, a monetary instrument, a check, a transportation ticket, a monetary substitute card, or the like. This carrier 1 includes a timing track 2, which in turn, advantageously includes three different types of optical time-markings 3, 4, and 5, which are arranged in a cyclic sequence. Furthermore, the carrier 1 includes a data track 6 with optical markings 7, which data track 6 is disposed in parallel with the timing track 2 which optical markings initially follow one another without the formation of any gap. The boundary line between the adjacent markings 7, which is in effect not visible, results from the geometric arrangement of the time-markings 3, 4 and 5. These time-markings and the marking 7 are entered or impressed onto the carrier 1, and differ from the marking-free surface of the carrier 1 by a mechanically detectable characteristic modification of any impinging light brought about through diffraction or refraction. Accordingly, the markings can for example, be diffraction screens, holograms, cinema-forms, Fresnel-lenses, etc.

Figure 3:
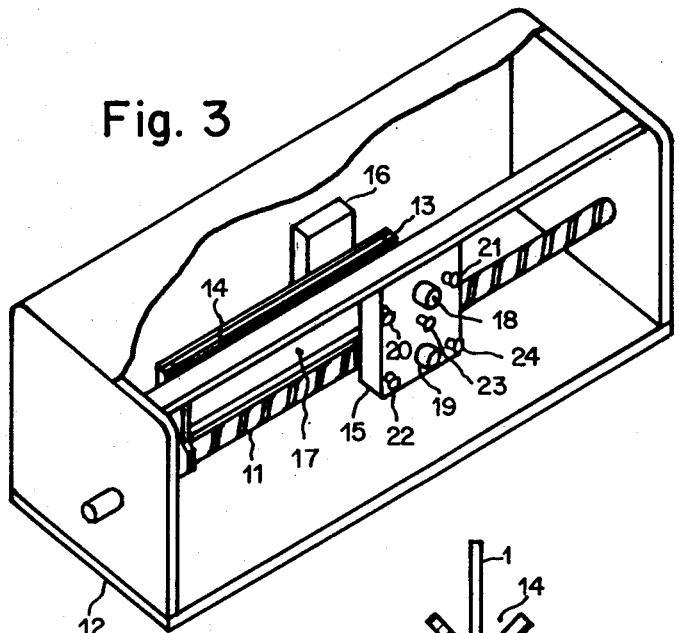
FIG. 3 shows a coding device for a carrier according to FIG. 1.

By means of the coding device illustrated in FIG. 3, coded information is fed to the data track 6, this being accomplished in that selected markings 7' are thermally erased, in other words are changed to such a degree while using heat, so that they no longer bring about the same characteristic modification of the impinging light, as the unchanged markings 7.

Figure 2:
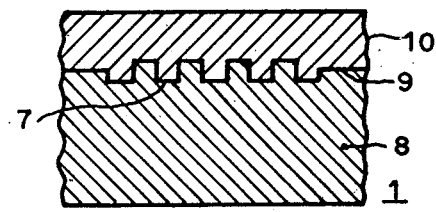
FIG. 2 shows the carrier according to FIG. 1 in a magnified cross-section.

In the illustrated example, the carrier 1 shown in FIG. 2 consists of a thermo-plastic layer 8 with impressed marking 7 in form of a phase diffraction screen, consisting of a thin reflecting layer 9 and a covering layer 10. The covering layer 10 is impervious to light and the carrier [-layer] 8 is permeable, for example, to infrared reading light beams, but, is impervious to visible light.

The coding device illustrated in FIG. 3 includes a screw 11 for advancing the carrier 1, which screw 11 is mounted in a rotatable manner in a housing 12, and is connected with a driving motor which is not illustrated. When the screw 11 is being driven, it carries along a card holder 13 in a linear manner and thereby moves the carrier 1, which is received in a receiving-slit 14, between a reading head 15 and an erasing head 16. Within the effective range of the reading head 15 and the erasing head 16, the card holder 13 is formed with openings 17. The reading head 15 includes light sources 18, 19 and light sensing devices 20 to 24, wherein the light source 18, as well as the light sensing devices 20, 21 are assigned to the data track 6, and the light source 19, as well as the light sensing devices 22 to 24 are assigned to the timing track 2. Each of the light sensing devices 22 to 24 responds to one of the time markings 3 to 5. A non-erased marking 7 excites predominantly the light sensing device 20, and an erased marking 7' predominantly excites the light sensing device 21.

Figure 4:
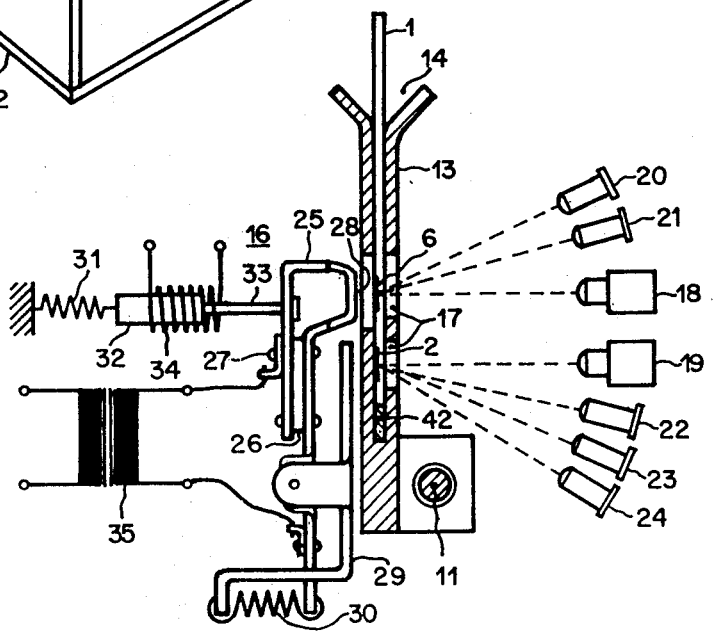
FIG. 4 shows portions of a coding device.

FIG. 4 shows an advantageous embodiment of the erasing head 16. The latter contains a heating element 25 in form of a metallic yoke, which is bent in form of a P, so that one extremity of the metallic yoke, spaced at a distance from its middle portion by means of an insulating piece 26, is mounted to the middle portion by means of rivets 27 consisting of insulating material. The erasing portion 28 of the heating element 25 is placed on an area which approximately corresponds to that of the markings 7. The heating element 25 is mounted in a rotatable manner on a stationary plate 29, and is prestressed by means of a spring 30, which—in the operating position assumed by the heating element 25 during the erasing process of a marking 7'—ensures that the erasing portion 28 abuts the top of the covering layer 10 of the carrier 1, while exerting a predetermined pressure thereon. In the rest position of the heating element 25, the force of a spring 31 opposes the force of the spring 30, and lifts the heating element 25 from the carrier 1, through the action of a solenoid armature 32 and a pull rod 33. When a solenoid coil 34 is excited, the pull rod 33 releases the heating element 25, which—through the force the of spring 30—is then pivoted into the working position. The heating element 25 is connected to the secondary winding of a transformer 35, which furnishes a current which, in turn, flows directly through the heating element 25.

In FIG. 4, also the arrangement of the light sources 18, 19 and of the light sensing devices 20 to 24 is indicated, which are located on the side of the carrier facing away from the erasing head 16, in other words they are located on the side of the layer 8.

Figure 5:
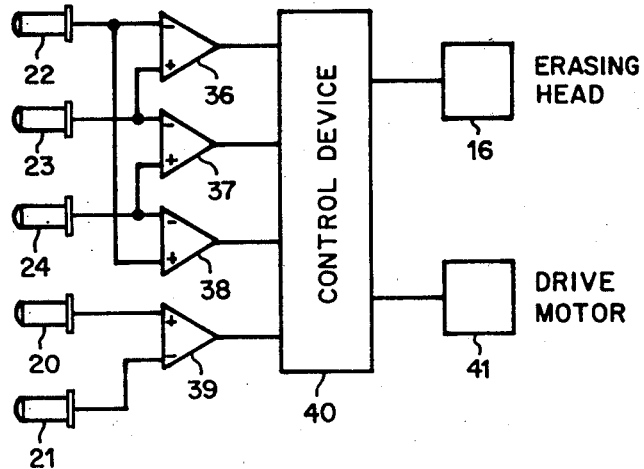
FIG. 5 shows a block-circuit-diagram of the coding device.

As can be seen from FIG. 5, two of respective elements 36 through 38 of light sensing devices 22 to 24 are in each case connected to the two inputs of a comparator. If, to give an example, a time marking 3 passes by the reading head 15, and if a time marking 4 follows the time marking 3, then the signal of the light sensing device 22 decreases continuously and that of the light sensing device 23 increases continuously during the transition from the time marking 3 to the time marking 4, however, an impulse-shaped output signal is obtained from the comparator 36.

The light sensing devices 20 and 21 are connected with a comparator 39. If a marking 7', which is located between the reading head 15 and the erasing head 16, is erased, the signal of the light sensing device 20 decreases and that of the light sensing device 21 increases. An impulse-shaped output signal from the comparator 39 is obtained, as soon as the thermal effect has brought about an erasure of the marking 7' which is considered adequate.

The comparators 36 to 39 are connected to a control device 40, which evaluates the signals of these comparators and controls the erasing head 16, as well as the driving motor which, in FIG. 5, is designated with the reference numeral 41.

The control device 40 contains an input device which is not illustrated. This input device receives a code, which, through erasing of the markings 7' is to be recorded on the carrier 1. A voltage is applied to the transformer 35, so that the heating element 25 is heated to a certain temperature. The control device 40 starts up the driving motor 41, and the carrier 1 which had been introduced into the card holder 13 passes between the reading head 15 and the erasing head 16. By means from the signals of the comparators 36 to 38, a counter in the control device 40 counts the time markings 3 to 5 which have passed by the reading head 15. A comparison-unit of the control device 40, compares the counting state of this counter with the code received by the input device. In case of an agreement, that is to say if a marking 7', which is to be erased, is present within the effective field of the reading head 15 and the erasing head 16, the driving motor 41 is stopped and the solenoid coil 34 is excited. The heating element 25 moves into a working position, the carrier 1 is heated in the area below the erasing portion 28 and the marking 7' is erased, that is to say, in the described example the embossment structure of the impressed phase diffraction screen reappear. During the erasing process, which takes a certain time which, in turn, depends on the temperature of the heating element 25, on the ambient temperature and on the consistency of the carrier 1, the reading unit is in operation, which consists of the light source 18, the light sensing devices 20, 21 and of the comparator 39. As soon as the output voltage of the comparator has fallen below a predetermined level, so that the marking 7' coming in contact with the heating element has been erased sufficiently, the control device 40 interrupts the current supply to the solenoid coil 34, as a result of which the heating element 25 is lifted-off from the carrier 1, and restarts the driving motor 41.

The advantages of the invention are now easily recognizable. The erasing process is not interrupted at a predetermined time period, but is immediately interrupted at the point when a sufficient erasing of the marking 7' has been achieved. In this manner, a sufficient erasure is also guaranteed under different working conditions, an excessive erasure of the marking 7' which is to be erased is avoided, as well as any undesired erasure of adjoining markings 7 and, depending on the application, a high operating speed and/or an optimum use of the available energy is achieved. The arrangement of erasing head 16 on the one side of the carrier 1 and the arrangement of the reading head 15 on the other side of the carrier 1, makes possible the simultaneous erasure and monitoring of the erasing by simple means.

The afore described scanning and counting of the time markings 3 to 5 during the search for positions to be erased on the data track 6, makes possible a very accurate positioning of the erasing head 16 at the position to be erased, which positioning is independent of the longitudinal tolerances of the carrier 1. If the carrier support 1 is devoid of any time-markings then, to give an example, the leading edge of the carrier 1 or the leading edge of the data track 6 can serve as position reference for locating the positions to be erased. In this case a stepping motor serves advantageously for driving the screw 11, which stepping motor moves the card holder 13 forward by a constant amount with each step, so that a certain number of steps brings about a forward movement of the card holder 13 by a distance which corresponds to the spacing of the markings 7. This allows one, without any intervention in the mechanic of the selecting device assigned to the control device 40, to preselect the number of steps of the stepping motor in accordance with the spacings of the markings 7 and to change therewith the spacing at any time in such a manner, so that carriers using different respective spacings can be encoded with the same coding device.

In order to be also able to adjust the height of the erasing head 16 and of the reading head 15 with respect to the longitudinal edge of the carrier 1, to the conditions existing each time, the depth of the receiving slit 14 (FIG. 4) can be advantageously changed by means of an exchangeable insert 42.

The afore described erasing head 16, the heating element 25 of which is pressed onto the carrier 1 during the erasing process and is lifted-off therefrom for the interruption of the erasing process, makes possible a higher operating speed, but, requires a relatively large amount of energy.

Figure 6:
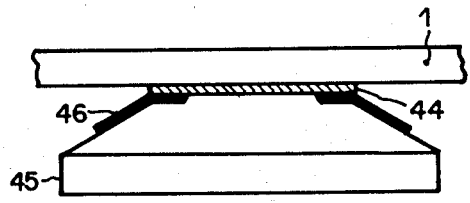
FIG. 6 shows a heating element in an enlarged side view.
Figure 7:
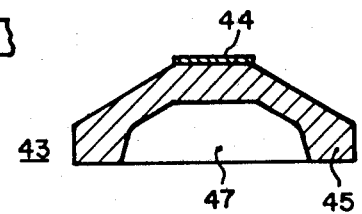
FIG. 7 shows the heating element of FIG. 7 in a cross-sectional view.

If, for the purpose of erasing the markings 7', only a small amount of energy is available, which is the case for example, when dealing with telephone sets which draw the energy for the erasing of the markings 7' from the subscriber's loop, then an erasing head 43 as shown in FIGS. 6 and 7 is used to advantage. This erasing head 43 contains a heating element 44 with a low heat capacity, the current supply of which, for the purpose of interrupting the erasing process, can be cut-off. In the illustrated example, the heating element 44 consists of a resistance layer which has been produced through screen printing processes or has been deposited through evaporation, and which is arranged on a substrate 45, and is provided with electrical contacts 46. In order to keep the energy consumption at a low level, the substrate 45 consists of a poorly heat-conducting material, for example of glass or of a ceramic substance. Furthermore, the substrate 45 is shaped in form of a truncated pyramid, in order for its thermal resistance to decrease with an increasing distance from the heating element 44, and in order for the energy flowing into the substrate to be quickly dissipated after termination of the erasing process. A recess 47 serves to obtain a uniform wall thickness of the substrate 45, so as to prevent material stresses and strains.

Figure 8:
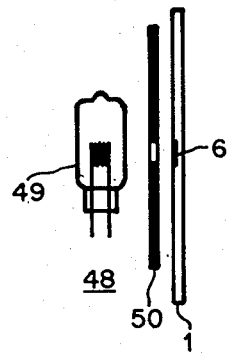
FIG. 8 shows an erasing head with a projection lamp.

Depending on the consistency of the covering layer 10 (FIG. 2) of the carrier 1, better results of the erasing process are achieved with either an erasing head abutting the carrier 1, or with a contactless erasing head which acts as heat radiating element. FIG. 8 shows a contactless erasing head 48 with a projection lamp 49, which serves as heat radiating element and is arranged at a distance from the carrier 1. A diaphragm 50 shields the carrier 1 from the heat radiation, with the exception of the areas to be erased.

Prior to the coding on the carrier 1, the projection lamp 49 is heated to the operating temperature, so that the heat radiation impinges on the card holder 13 and remains ineffective. Subsequently, the driving motor 41 is started and the carrier 1 is advanced at such a high speed, so that the radiation of heat no longer brings about a noticeable change in the data track 6. As soon as a position to be erased is reached, the driving motor 41 is stopped and the heat radiation brings about the erasing of a marking 7'. After an adequate erasure, the erasing process is cut-off through a renewed activation of the driving motor 41.

In the case of a carrier having a relatively low softening value, it can be of advantage to operate the projection lamp 49 at a reduced voltage during the advancement of the carrier 1, and to increase the voltage to the nominal value only after reaching an erasing position.

With an optical image producing system, which is not illustrated in FIG. 8, the degree of effectiveness of the erasing process can be improved. It is also possible to use an electronic flash bulb as heat radiating element, in place of the projection lamp 49. We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. An apparatus adapted for thermally erasing or changing machine readable optical markings previously entered on a carrier of thermoplastic material having two major sides, the optical markings causing a predetermined modification of any light rays impinging on said optical markings by either diffraction or refraction, comprising in combination:
   erasing means adapted to be located on one major side of said carrier, for erasing or changing said markings,
   reading means, operative during operation of said erasure means, and including at least two light sensors adapted to be located on the other major side of said carrier, so as to check the erasure or change of said markings effected by said erasing means, the light sensors providing output signals of respective opposite polarities following erasure or change of any one of said markings,
   moving means operable for generating a relative movement between said carrier and said erasing and reading means, respectively,
   a comparator postcoupled to said light sensors, and including detection means for indicating whether the output of said comparator means exceeds or is below respective predetermined limits, and
   control means for controlling the operation of said erasing means and of said moving means, and arranged to inhibit the operation of said erasure means when the output of said comparator means exceeds or falls below said limits, respectively, whereby said limits establish a uniform criterion for effecting erasure of said markings.

2. An apparatus as claimed in claim 1, wherein said erasing means includes heating means movable between a first position near said carrier during erasure or change of said markings, and a second position remote from said carrier during interruption of the erasure or change of said markings.

3. An apparatus as claimed in claim 1, wherein said erasing means includes heating means of relatively low thermal capacity having a current supply which may be switched off during the erasure period or change period of said markings.

4. An apparatus as claimed in claim 3, wherein said erasing means includes a substrate having substantially the shape of a truncated pyramid, said heating means being disposed near the smaller end surface of said truncated pyramid, and a resistance layer formed with electrical contacts disposed on said substrate.

5. An apparatus as claimed in claim 1, wherein said erasing means includes heat radiation means spaced apart from said carrier, and wherein the erasure or change of said markings may be interrupted by moving said moving means rapidly away from said carrier.

6. An apparatus as claimed in claim 5, wherein said heat radiation means includes a projector lamp.

7. An apparatus as claimed in claim 5, wherein said heat radiation means includes an electronic flashlight.

8. An apparatus as claimed in claim 1, wherein said moving means includes a rotatable gear, a drive motor coupled to said gear, and carrier-holding means connected to said gear and linearly drivable thereby.

9. An apparatus according to claim 8, wherein said markings are spaced from one another by respective predetermined distances, said drive motor is a stepping motor advanceable in a plurality of discrete steps, and wherein said control means includes selection means for selecting said plurality of steps in dependence of said predetermined distances.

10. An apparatus as claimed in claim 1, wherein said reading means includes at least one additional light sensor adapted to scan said optical markings, and wherein said control means includes a counter for counting the scanned optical markings, input means for receiving the code, and comparing means for comparing the count of the counter with the code received by said input means, and for initiating erasure or change of one of said markings when said code coincides with said count.

11. An apparatus for thermally erasing or changing machine readable optical markings,
comprising in combination:

a carrier of thermoplastic material having two major sides, said optical markings having been previously entered on said carrier, and causing a predetermined modification of any light rays impinging on said optical markings by either diffraction or refraction, erasing means arranged to be located on one major side of said carrier, for erasing or changing said optical markings, reading means, operative during operation of said erasure means, and including at least two light sensors arranged to be located on the other major side of said carrier, so as to check the erasure or change of said markings effected by said erasing means, the light sensors providing output signals of respective opposite polarities following erasure or change of any one of said markings, moving means operable for generating a relative movement between said carrier, and said erasing and reading means, respectively, a comparator postcoupled to said light sensors, and including detection means for indicating whether the output of said comparator means exceeds or is below respective predetermined limits, and control means for controlling the operation of said erasing means and said moving means, and arranged to inhibit the operation of said erasure means when the output of said comparator means exceeds or falls below said limits, respectively.

* * * * *